(12) United States Patent
Jaklitsch et al.

(10) Patent No.: US 8,552,908 B2
(45) Date of Patent: Oct. 8, 2013

(54) METHOD AND APPARATUS FOR IMPLEMENTING HIGH FIDELITY DOPPLER PHASE AND TIME EFFECTS IN ADVANCED EW STIMULUS SYSTEMS

(75) Inventors: James J. Jaklitsch, Parkton, MD (US); Hariklia Karagiannis, Baltimore, MD (US)

(73) Assignee: AAI Corporation, Hunt Valley, MD (US)

( * ) Notice: Subject to any disclaimer, the term of this patent is extended or adjusted under 35 U.S.C. 154(b) by 162 days.

(21) Appl. No.: 13/176,500

(22) Filed: Jul. 5, 2011

(65) Prior Publication Data
US 2013/0009822 A1 Jan. 10, 2013

(51) Int. Cl.
*G01S 7/40* (2006.01)

(52) U.S. Cl.
USPC ............ 342/171; 342/73; 342/84; 342/169; 342/418

(58) Field of Classification Search
USPC ............ 342/73, 84, 98–99, 104, 106–107, 342/169, 171, 418
See application file for complete search history.

(56) References Cited

U.S. PATENT DOCUMENTS

| | | | | |
|---|---|---|---|---|
| 5,117,231 A | * | 5/1992 | Yaron | 342/195 |
| 5,381,156 A | * | 1/1995 | Bock et al. | 342/126 |
| 5,657,022 A | * | 8/1997 | Van Etten et al. | 342/104 |
| 6,532,271 B1 | * | 3/2003 | Hwang et al. | 375/326 |
| 2008/0272956 A1 | * | 11/2008 | Pedersen et al. | 342/107 |
| 2009/0273505 A1 | * | 11/2009 | Pearson et al. | 342/81 |
| 2012/0056772 A1 | * | 3/2012 | Jaffer et al. | 342/99 |
| 2012/0293359 A1 | * | 11/2012 | Fukuda et al. | 342/107 |

\* cited by examiner

*Primary Examiner* — John B Sotomayor
*Assistant Examiner* — Marcus Windrich
(74) *Attorney, Agent, or Firm* — Venable LLP; Jeffri A. Kaminski

(57) ABSTRACT

A high fidelity simulation of Doppler that may exactly replicate the phenomenology of the physical world. Compute the linear (Line of sight) kinematics (Slant Range, Radial Velocity, and Radial Acceleration) for each of a multiplicity of emitter-receiver pairs in accordance with exact 3D vector mathematics. Smoothly interpolate the linear kinematic parameters to produce accurate instantaneous values of these parameters at sample rates sufficient to produce negligible error effects in the presence of realistic aircraft maneuvers. Calculate the Doppler frequency, in accordance with well known physics, from the emitter carrier wavelength and a high sample rate. Calculate the Doppler effect as a differential phase (Doppler frequency×sample time) and apply the effect as incremental phase shifts to the carrier signal.

19 Claims, 4 Drawing Sheets

Constrained Integration Up-sampling and Doppler Processing

Figure 1: Simulation Processing Through Radial Kinematics
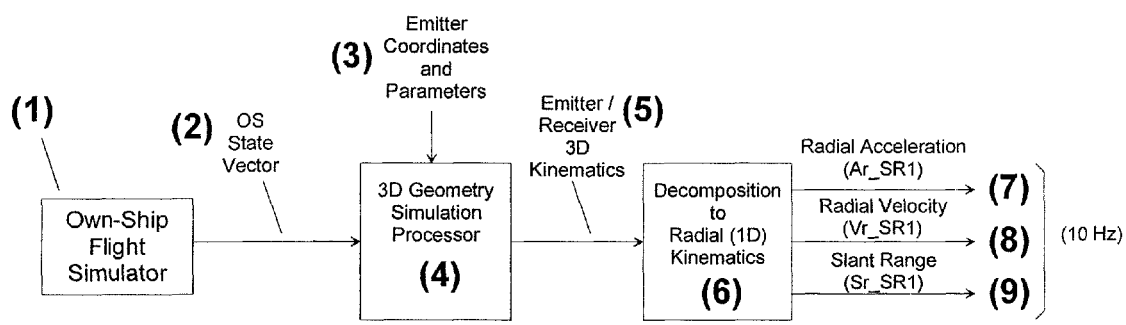
Figure 2: Constrained Integration Up-sampling and Doppler Processing
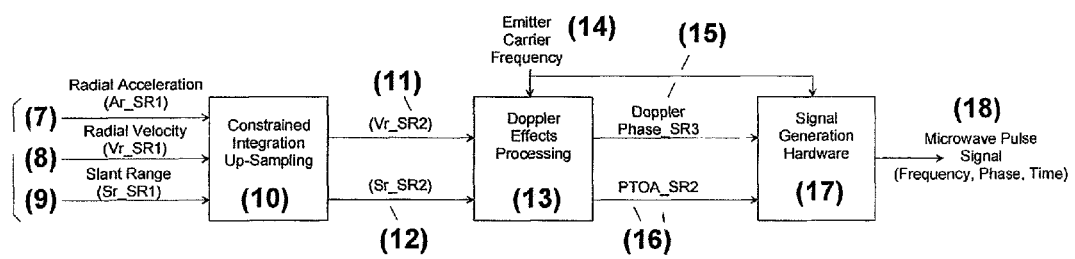

Figure 3: Constrained Integration Up-sampling (10) Detail
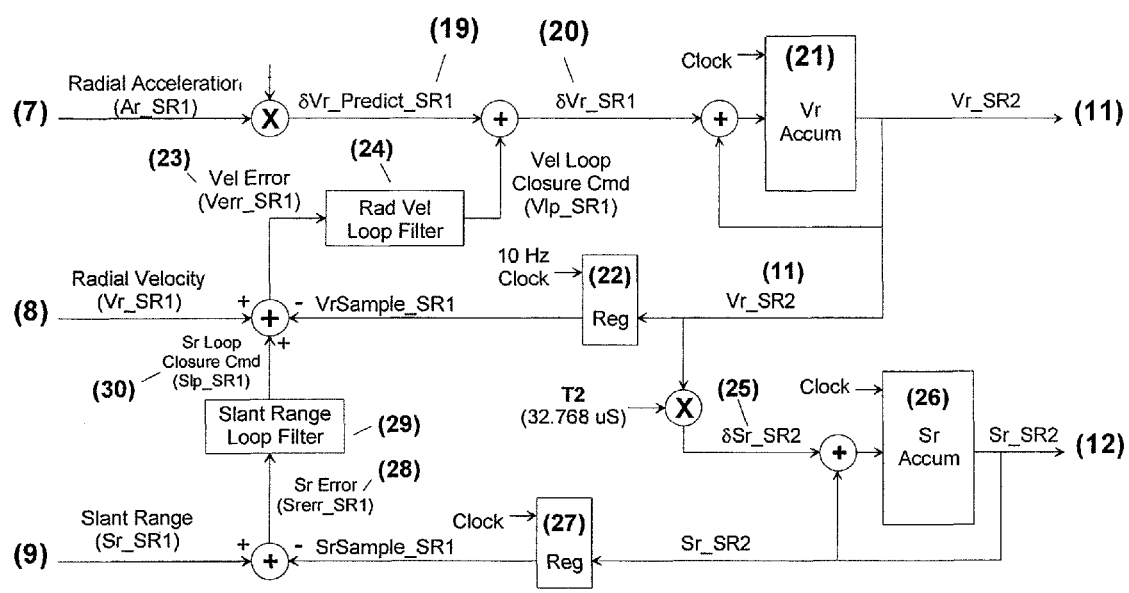

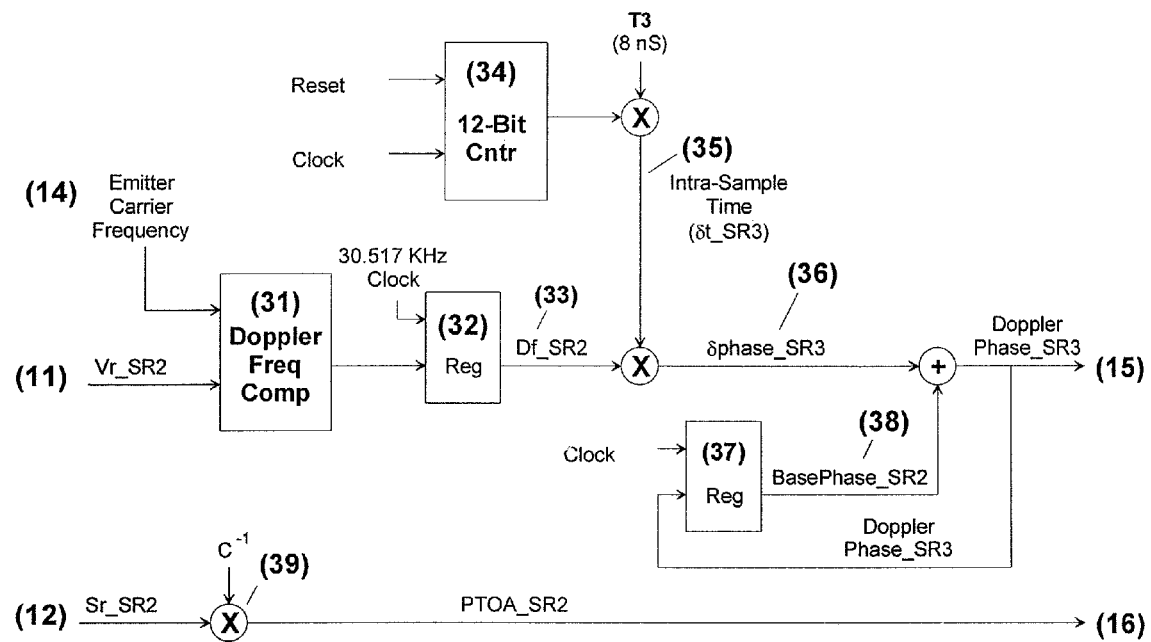
Figure 4: Doppler Effects Processing (13) Detail

Figure 5: Signal Generation (17) Detail
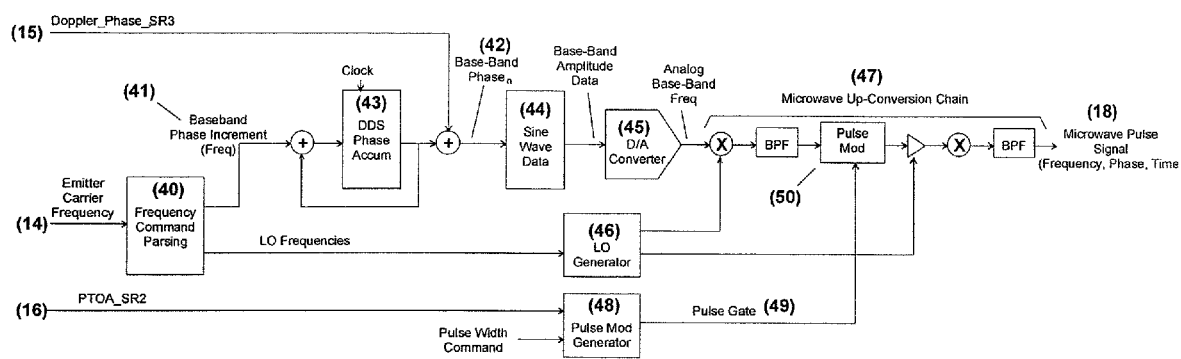

METHOD AND APPARATUS FOR IMPLEMENTING HIGH FIDELITY DOPPLER PHASE AND TIME EFFECTS IN ADVANCED EW STIMULUS SYSTEMS

BACKGROUND

In accordance with well known physics, the Doppler effect is a frequency shift that occurs to a signal as it propagates from a source to a receiver, where the source and receiver are in motion with respect to each other. It is a well known effect in both acoustics and in the electromagnetic frequency spectrum. The Doppler effect is exploited by systems such as Doppler Radar, which use the phenomena to measure the velocity of a target.

In electromagnetic environment simulation systems, the radio frequency (RF) emissions of a vast number of RF emitters are simulated to replicate the electromagnetic environment of a modern battlefield. The RF emitters may simulate fixed or moving (airborne) radar installations, as viewed from an airborne surveillance system (Own Ship). Systems of this type include the AAI Advanced Standard Threat Generator (ASTG), the Northrop Grumman Combat Electromagnetic Environment Simulator (CEESIM), and the AAI Advanced Architecture Phase Amplitude Time Simulator (A2PATS).

Doppler effects are computed from the radial velocity between the emitter and the receiver:

$$\text{Doppler\_Freq(one-way)} = -\text{Rad\_Vel}/\lambda$$

Where: Doppler_Freq (one way) denotes the frequency shift, in units of Hertz, that is caused by one-way propagation from an emitter to a receiver, due to relative motion between them. Radar problems involve 2-way propagation, so the radar equation for Doppler has an additional factor of 2.

Rad_Vel denotes the radial velocity between the emitter and receiver, in units of distance per unit time (e.g., ft/sec). Radial velocity is defined as the time rate of change of the slant range from the receiver to the emitter. Positive radial velocity indicates increasing, or opening, range. Positive Doppler is induced by closing (negative) radial velocity.

$\lambda$ denotes the emitter carrier wavelength, in units of length (e.g., ft) similar to the units for radial velocity.

Multiple emitters, as viewed by a common receiver, typically each have their own Doppler shift, because the emitters typically have different wavelengths and different radial velocity.

Doppler frequency shift is typically applied as a quasistatic frequency offset to the emitter carrier frequency. In addition, since there is a relatively large amount of 3D vector mathematics involved in computing the slant range and radial velocity (hence, the Doppler), an update rate is limited by the amount of computing power required to perform each update. Doppler frequency update rates are usually less than 100 Hz (100 times a second), and even the highest fidelity implementations are less than 1 KHz.

One of the problems with prior implementations is their fundamental inability to deal with new requirements for high fidelity Doppler simulation. New digital receivers have advanced geo-Location abilities. In order to test these next-generation systems, electromagnetic environment simulators are required to simulate Doppler effects at a much higher level of fidelity than ever before. In particular, there is a requirement to accurately simulate differential effects as the aircraft maneuvers and accelerates.

The implications of producing a significantly higher fidelity Doppler simulation are twofold: First, Doppler must be treated not as an offset frequency, but rather as a continual accumulation of differential phase. The rate of phase accumulation (frequency) must slew in accordance with radial acceleration, thereby exactly mimicking the real-world Doppler phenomena. Second, the Doppler update rate must be much, much faster than legacy implementations (i.e., tens of KHz), in order to faithfully replicate the phenomenology. This leads to a huge issue of how to compute the 3D vector mathematics at the required rate.

SUMMARY

The implications of producing a significantly higher fidelity Doppler simulation are twofold: First, Doppler must be treated not as an offset frequency, but rather as a continual accumulation of differential phase. The rate of phase accumulation (frequency) must slew in accordance with radial acceleration, thereby exactly mimicking the real-world Doppler phenomena. Second, the Doppler update rate must be much, much faster than legacy implementations (i.e., tens of KHz), in order to faithfully replicate the phenomenology. This leads to a huge issue of how to compute the 3D vector mathematics at the required rate.

In an embodiment, a computer readable medium stores computer readable program code for causing a computer perform the steps of:

receiving state vector data regarding emitter receiver pairs sampled at a first rate;

transforming the state vector data to scalar data for each of the plurality of emitter-receiver pairs;

converting the scalar data to a slant range and a radial velocity for the emitter-receiver pair at a second sample rate higher than the first sample rate;

determining a Doppler frequency for each pair based on a carrier wavelength at the second sample rate; and determining a Doppler effect based on the Doppler frequency as a differential phase at a third sample rate that is higher than the second sample rate.

In another embodiment, method, comprises:

determining with a computer slant range, radial velocity and radial acceleration for respective ones of a plurality of emitter and receiver pairs at a first sample rate;

interpolating with a computer the slant range, radial velocity and radial acceleration to produce a radial velocity and a second sample rate higher than the first sample rate;

computing with a computer a Doppler frequency based on the second radial velocity and an emitter carrier wavelength;

computing with a computer a differential phase at a third sample rate higher than the second sample rate; and applying the differential phase to the carrier signal to produce an output signal; and simulating the emitters based on the output signal.

This summary is provided merely to introduce certain concepts and not to identify any key or essential features of the claimed subject matter. Further features and advantages of embodiments of the invention, as well as the structure and operation of various embodiments of the invention, are described in detail below with reference to the accompanying drawings.

BRIEF DESCRIPTION OF THE DRAWINGS

The foregoing and other features and advantages of embodiments of the invention will be apparent from the following, more particular description of embodiments of the invention, as illustrated in the accompanying drawings wherein like reference numbers generally indicate identical, functionally similar, and/or structurally similar elements. Unless otherwise indicated, the accompanying drawing figures are not to scale.

FIG. 1 depicts a process according to an embodiment of the present invention;

FIG. 2 a process according to an embodiment of the present invention;

FIG. 3 depict a detailed view of a up sampling process as shown in FIG. 1, according to an embodiment of the present invention;

FIG. 4 depict a detailed view of a Doppler effects process as shown in FIG. 1, according to an embodiment of the present invention;

FIG. 5 depicts depict a detailed view of a signal generation process as shown in FIG. 1, according to an embodiment of the present invention.

DETAILED DESCRIPTION

Various embodiments of the invention are discussed herein. While specific embodiments are discussed, specific terminology is employed for the sake of clarity. However, the invention is not intended to be limited to the specific terminology so selected and it should be understood that this is done for illustration purposes only. A person skilled in the relevant art will recognize that other components and configurations can be used without parting from the spirit and scope of the invention. Each specific element includes all technical equivalents that operate in a similar manner to accomplish a similar purpose.

Embodiments of the invention produce a high fidelity simulation of Doppler that may exactly replicate the phenomenology of the physical world. Embodiments of the invention may:

Compute the linear (Line of sight) kinematics (Slant Range, Radial Velocity, and Radial Acceleration) for each of a multiplicity of emitter-receiver pairs in accordance with exact 3D vector mathematics. In a typical implementation, there is about a 256 maximum pairs per receiver antenna port Smoothly interpolate (no discontinuous derivatives) the linear kinematic parameters (i.e., Slant Range and Radial Velocity) to produce accurate instantaneous values of these parameters at sample rates (e.g., 30.5 KHz) sufficient to produce negligible error effects in the presence of realistic aircraft maneuvers.

Calculate the Doppler frequency, in accordance with well known physics, from the emitter carrier wavelength and a high sample rate, for example, 30.5 KHz, Radial Velocity.

Calculate the Doppler effect as a differential phase (Doppler frequency×sample time) at the signal generation Direct-Digital Synthesis rate, for example 125 MHz, and apply the effect as incremental phase shifts to the carrier signal (Phase increments in the Direct-Digital Synthesizer phase accumulator.

One of the advantages of this type of implementation is it may exactly replicate the Doppler Phenomena as it occurs in the physical world. In physics, the Doppler Effect, usually expressed as a frequency shift, is technically only a frequency shift for the special case of constant radial velocity. In the more general case, in which radial velocity is not constant (non-zero radial acceleration) the Doppler effect is the accumulation of differential phase shifts. The rate of phase accumulation, over time, manifests itself as an apparent frequency shift. The implementation as a phase accumulation is a faithful reproduction of physics in the presence of non-zero acceleration.

A significant advantage some of the approaches described herein is the combination of high geometric accuracy (only possible with precise 3D vector mathematics), with high speed sample rates (much, much higher than the rate at which 3D vector geometry solutions can be directly calculated). The nested constrained integration used in the up-sampling process has the unique ability of producing high sample rate solutions that maintain the full accuracy of the 3D vector geometry. This accuracy may be needed to model the differential effects associated with spatially separated antennae on a maneuvering aircraft, as those antennae receive the emissions from a common distant emitter.

In the following discussion, an SR1 suffix on a signal name denotes data sampled at Sample Rate 1. In this example, Sample Rate 1 may be 10 Hz. An SR2 suffix denotes data sampled at Sample Rate 2. In this example, sample rate 2 may be 125 MHz/4096=30.517 KHz. An SR3 suffix denotes data sampled at Sample Rate 3. In this example, sample rate 3 may be 125 MHz. Other sample rates may be used based on the particular implementation.

FIGS. 1 and 2 illustrate Block Diagram of the High Fidelity Doppler implementation according to an exemplary embodiment of the invention. In this embodiment, FIG. 1 illustrates processing performed in software, at the first sample rate. The processing illustrated in FIGS. 2, 3 and 4 may be performed in this example in Hardware accelerators that enable the data sampling rates to be increased, first to an intermediate (SR2) rate, and finally to the signal generation (SR3) rate necessary to represent Doppler Phase. Embodiments of the invention and the various steps described herein may be implemented as hardware, software, or a combination thereof.

In Electromagnetic Environment Simulation systems, an aircraft, typically designated as the Own-ship, maneuvers through a simulated electronic battlefield. The Own-ship is controlled by a flight simulator (1). The Position, Velocity, and Attitude of the aircraft may be represented in the flight simulator by an Own-Ship State Vector (2). The Own-Ship State Vector may include, among other information, terms for Position (x, y, z), Velocity (x, y, z), Acceleration (x, y, z), Orientation (yaw, pitch, roll), and rate of change in orientation (yaw, pitch, roll)

The data sample rate for the Own-ship State Vector is typically pretty low, as it is describing macroscopic behavior of a large object (Aircraft). In this example, the first sample rate (SR1) may be 10 Hz.

The simulation of the battlefield electromagnetic environment is performed in a Simulation Processor (4) in accordance with well-known physical equations and 3D vector geometry. The coordinates and signal parameters of a multiplicity of Emitters (3) serves as an input to the simulation. Each emitter has coordinates in the space and signal parameters that define its RF output signature characteristics. The parameters and coordinates received may include receive and emitter antenna position vectors.

The specific parameters of interest (Doppler Effect and Pulse Time of Arrival, or PTOA) are derived from the 3D kinematics (5) between the Emitter and Receiver. The 3D kinematics (5) between each of a multiplicity of Emitter—Receiver pairs are computed in accordance with known mathematical techniques for computing coordinates of various entities in 3D space. These known mathematical techniques include a series of coordinate transformations and vector operations that are, in general, very computationally intensive. Because there may be a vast number of emitter-receiver pairs, and because extensive software-based computation is required for each emitter-receiver pair, the update rate for the 3D kinematic data (5) is typically restricted (SR1=10 Hz).

Embodiments of the invention may derive accurate real-time Doppler phase accumulation and PTOA high resolution timing from the limited sample rate of the 3D kinematic data (5).

As shown in FIG. 1, the 3D kinematic vectors (5) may be decomposed into 1D scalar kinematic parameters such as Radial Acceleration (7), Radial Velocity (8), and Slant Range (9). Initially, these scalar parameters (7, 8, 9), may be at the same sample rate as the 3D kinematic data (5). In this example, SR1=10 Hz.

Turning to FIG. 2, a nested constrained integration (10) may be used to Up-sample the scalar kinematic parameters (7, 8, 9) to Radial Velocity (11) and Slant Range (12) at sample rates that may be faster, for example, thousands of times faster (SR2=30.517 KHz) than sample rate 1. The second sample rate (SR2) may provide the time resolution required for accurate simulation of Doppler and PTOA effects. The nested constrained integration up-sampling process may ensure that there are essentially no discontinuities in the radical velocity and slant range (11,12) and that the radical velocity and slant range accurately tracks the scalar kinematic data (7,8,9).

Doppler Effects Processing (13) may compute the incremental phase (15) at a third sample rate for example (SR3=125 MHz). The Doppler may be applied, not as a frequency offset, but rather as a continuously slewing Phase (15), derived from the Emitter Carrier Frequency (14) and Radial Velocity (11). Signal Generation Hardware (17) may be used to generate the output signal (18).

Doppler Effects Processing (13) may additionally compute an associated result for PTOA (16) that is intrinsically coordinated with the phase data (15). The PTOA data (16) may be provided to the Signal Generation Hardware (17) at the second sample rate (30.517 KHz), as the rate of significant change in PTOA is much slower than the rate of significant change in Phase. The third sample rate (125 MHz) may be the master clock rate, for example, of a Direct Digital Synthesizer in the Signal Generation Hardware (17), and the SR2 rate (30.517 KHz) may be a binary sub-multiple of the third sample rate, for example, SR2=SR3/4096.

Within the Simulation (4), the location and motion of all emitters and receivers are represented by 3D vectors for position and velocity. Acceleration vectors may be available in some cases, but in the more general case, must be computed as the derivative of the velocity. The linear kinematic parameters (7,8,9) may be determined by decomposing the 3D kinematic data (6).

For example, the Position Difference Vector may be determined as the Receive Antenna Position vector minus the Emitter Antenna Position vector. The Magnitude of the Position Difference Vector is the Slant Range (9; Sr_SR1).

The X-axis of the Incident Radiation Frame (IRF X-axis) is a unit direction vector that may be determined by dividing the Position Difference Vector by its Magnitude. The Radial Velocity (8; Vr_SR1) may be determined as the scalar summation of the emitter and receiver opening rates, where the receiver opening rate may be the vector Dot Product of the Receiver Antenna Velocity onto the IRF X-axis and the emitter opening rate may be the negative Dot Product of the Emitter Antenna Velocity onto the IRF X-axis.

The Radial Acceleration (7; Ar_SR1) may be the derivative of the Radial Velocity.

Once the radial acceleration, radial velocity and slant range are determined, these values may be used to determine the radial velocity and slant range at the second sample rate. FIG. 3 illustrates an exemplary implementation of the Constrained Integration Up-sampling process (10). This function is tasked with converting the scalar kinematic parameters for Radial Acceleration (7), Radial Velocity (8) and Slant Range (9), each sampled at the rate of the 3D Geometry Processing (SR1=10 Hz), to Radial Velocity (11) and Slant Range (12) at the second sample rate. The second sample rate may be high enough to accurately represent the instantaneous Doppler Phase slew rate in the presence of high G (e.g., 5G) maneuvers between Emitter-Receiver pairs. The second sample rate may be 30.517 KHz.

The process begins by integrating the Radial Acceleration at the first sample rate (7; Ar_SR1) to develop a real-time prediction of Radial Velocity at the second sample rate (11; Vr_SR2). The SR1 value of Radial Acceleration (7; Ar_SR1) is multiplied by the period of the second sample rate (T2=32.768 msec) to form a delta velocity prediction (19; 5Vr_Predict_SR1). This signal has an SR1 suffix, because it only updates at the first sample rate, but it represents the differential velocity to be added during each clock of the second sample rate.

If the output of the Radial Velocity Loop Filter (24) is zero, the input to the integration (20) is the same as the prediction (19).

This signal is integrated in the Radial Velocity (Vr) Accumulator (21) to produce a real-time prediction of Radial Velocity at the second sample rate (11; Vr_SR2). The Vr Accumulator (21) may be a digital integrator. On each clock cycle, it adds the input velocity increment (20; OVr_SR1) to the velocity value (11; Vr_SR2) already stored in the accumulator (21). Because the Vr Accumulator (21) may be a free integrator, it should be constrained to prevent its output (11; Vr_SR2) from deviating over time from the Radial Velocity at the first sample rate. This constraint may be applied in the form of a correction loop (22, 23, 24). The output of the Vr Accumulator (11; Vr_SR2) is sampled in a register (22) at the first sample rate update interval. The sampled output of the register (22; VrSample_SR1) is subtracted from the input Radial Velocity (8; Vr_SR1) to form the Velocity Error (23; Verr_SR1). The velocity error signal is applied to the Radial Velocity Loop Filter (24) to form the Velocity Loop Closure Command (VIp_SR1), which is added to the open loop prediction (19; OVr_Predict_SR1) to form the input (20; OVr_SR1) to the Vr Accumulator (21).

The correction loop (22, 23, 24) serves to ensure that the up-sampled value of Radial Velocity (11; VrSR2) accurately tracks the input value. Although there are more samples of the radial velocity output (11; Vr_SR2), than of the input (8; Vr_SR1), for example a ratio of 3052:1, the action of the loop (19, 20, 21, 22, 23, 24) constrains the output (11; Vr_SR2) to equal the input (8; Vr_SR1) for each sample of the input.

It logically follows, since the up-sampled value of Radial Velocity is derived by integrating radial acceleration and is constrained to match the input radial velocity at regular intervals, that it faithfully represents the Radial Velocity for all sample intervals between the input values (8; Vr_SR1). The Constrained Integration Up-sampling process (10) thus maintains the full accuracy of the 3D Emitter/Receiver Kinematics (5), but produces vastly higher temporal resolution.

The Radial Velocity Loop Filter (24) may employ both proportional and integral gain terms. The proportional term is set to remove any non-zero error (23) over one period of the first sample rate. Thus, any non-zero error should be completely removed by the next sample of the loop error (23). The integral gain is set to provide additional performance in the presence of sustained radial jerk (Sustained non-zero derivative of radial acceleration).

The Slant Range (9; Sr_SR1) is up-sampled in a similar manner (Using constrained integration) to produce a real-time value of Slant Range at the second sample rate (12;

Sr_SR2). The radial velocity (11; VrSR2) is multiplied by the period of second sample rate (T2=32.768 psec) to form a delta range increment (25; OSr_SR2). This signal is integrated in the Slant Range (Sr) Accumulator (26) to produce a real-time prediction of Slant Range at SR2 (12; Sr_SR2). The Sr Accumulator (26) may be a digital integrator. On each clock cycle (SR2=30.517 KHz), the Sr Accumulator adds the Slant Range increment (25; 8Sr_SR2) to the Slant Range value (12; Sr_SR2) already stored in the accumulator (26).

The output of the Sr Accumulator (12; Sr_SR2) is sampled in a register (27) at the first sample rate update interval. The sampled output of the register (27; SrSample_SR1) is subtracted from the input Slant Range (9; Sr_SR1) to form the Slant Range Error (28; Srerr_SR1). This error signal is applied to the Slant Range Loop Filter (29) to form the Slant Range Loop Closure Command (30; Slp_SR1). Command (30) drives the closed loop response of the radial velocity tracking loop (23, 24, 20, 21, 11, 22), adjusting the velocity slightly to remove any non-zero Slant Range Error (28) over the next first sample period.

FIG. 4 illustrates the implementation of the Doppler Effects Processing (13). The process begins by computing (31) the Doppler_Frequency (from well known Physics) based on Radial Velocity (11) and Emitter Carrier Frequency (14), then storing the result in a Register (32). The Radial Velocity input (11; Vr_SR2) and the Register (32) are both updated at the second sample rate, which is fast enough to accurately track Doppler (<0.25 Hz Resolution) in the presence of significant acceleration for example, acceleration −5G to +5G.

The register output (33; Df SR2) is the Doppler frequency with the second sample rate temporal resolution. The elapsed time from the last Clock (35; Ot_SR3) is produced by a counter (34) that is reset on each occurrence of the second sample rate Clock (30.517 KHz Reset), and allowed to up-count at the third (125 MHz) sample rate. The counter (35) thus contains the number of third sample rate clocks that have occurred since the last second sample rate clock. The number of third sample rate clocks is multiplied by the third sample period (T3=8 ns) to produce the intra-sample time (35; 8t_SR3), in units of seconds.

The Doppler_Frequency (33; Df SR2) is multiplied by the intra-sample time (35; Ot_SR3), to produce the phase change (36; aphase_SR3), in units of cycles, that has accumulated since the last second sample rate clock (Frequency×time=Phase). This phase change (36; 8phase_SR3) is added to the Base Phase (38; BasePhase_SR2) to produce the Doppler Phase at third sample rate temporal resolution (15; Doppler_Phase_SR3). The Base Phase is simply the value of phase (15; Doppler_Phase_SR3) at the last occurrence of the second sample rate Clock. This value is sampled in a register (37) and until the next occurrence of the second sample rate Clock, at which time a new phase sample is stored. The output (15; Doppler_Phase_SR3) is thus a continuous phase progression at the third sample rate.

The functional breakdown of the Signal Generation Hardware (17), is illustrated in FIG. 5. The Signal Generation Hardware is a combination of a Base-band Direct Digital Synthesizer (DDS) (43, 44, 45), and a microwave up-converter (46, 47). The Emitter Carrier Frequency command (14) is parsed (40) into two frequency control components: one for the Baseband DDS (43, 44, 45), and the other for the LO Generator (46), which translates (47) the Analog Baseband Frequency out of the DDS to the required microwave frequency output (18).

The Baseband DDS may be comprised of a Digital Phase Accumulator (43), a Sine wave Data Table (44) and a Digital to Analog (D/A) converter (45). The Digital Phase Accumulator (43) is a N-Bit digital integrator, clocked at the third sample rate. The accumulated data represents the phase in one cycle of the output frequency. Zero represents zero degrees of Phase, while $2^n-1$ represents 360 degrees of Phase.

The Frequency Command Parsing (40) separates out the baseband component of required frequency (41). This term, the Baseband Phase Increment, is the amount of incremental phase that must be added to the phase in the Accumulator (43) with each increment of the third sample rate clock in order to cause the output of DDS Phase Accumulator to slew at the required baseband frequency.

The Doppler phase (15; Doppler_Phase_SR3) is added to the output of the Phase Accumulator (43) to produce a composite phase (42). Since both the Phase Accumulator (43) and the Doppler (15) are updating at the third sample rate, the composite phase (42) is the real-time summation of phase contributions from both carrier frequency and Doppler. The Sine Wave Date (44) is effectively a phase to amplitude conversion that outputs a digital amplitude as a function of phase. The D/A Converter (45) translates the digital amplitude data stream to an analog signal for up conversion (47) and output as a microwave signal (18).

The Pulse Time of Arrival data (16; PTOA_SR2) is input to a Pulse Modulation Generator (48), which generates a Pulse Gate (49) that drives a Pulse Modulator in the Microwave Up-Conversion Chain (47). The Pulse Modulator may be a high-isolation switch that gates the RF output (18). It thus forms the pulse envelope of a gated RF frequency. The Pulse Mod Generator (48) uses the Pulse Time of Arrival Data (16; PTOA_SR2) to determine when to generate the leading edge of the Pulse Gate (49). The duration of the Pulse Gate is determined by a pulse width command, which is separate input to the Pulse Mod Generator.

The output signal from the signal generation hardware (17) is a microwave pulse or CW signal (18) that has frequency, phase and Pulse Time of Arrival characteristics that replicate the Doppler/Time modulation effects induced by motion between emitters and receivers.

The continuous phase slew (15) captures the Doppler Effect as it occurs in the physical world. In the special case of constant radial velocity, the rate of phase slew is constant, which produces a steady Doppler frequency. In the more general case of non-zero radial acceleration, the continuous phase slew (15) accurately captures time-varying rate of phase accumulation that exactly replicates the physical phenomena (Which legacy implementations cannot replicate).

It will be understood that the above description of the present invention is susceptible to various modifications, changes and adaptations, and that the same are intended to be comprehended within the meaning and range of equivalents of the appended claims.

What is claimed is:

1. A method, run on a processor, comprising:
   receiving state vector data regarding emitter receiver pairs sampled at a first rate;
   transforming the state vector data to scalar data for each of the plurality of emitter-receiver pairs;
   converting the scalar data to a slant range and a radial velocity for the emitter-receiver pair at a second sample rate higher than the first sample rate;
   determining a Doppler frequency for each pair based on a carrier wavelength at the second sample rate;
   determining a Doppler phase based on the Doppler frequency as a differential phase at a third sample rate that is higher than the second sample rate;

storing the Doppler frequency in a computer readable medium; and multiplying the stored Doppler frequency based on the third sample rate.

2. The method of claim 1, further comprising adding an incremental Doppler phase to a carrier signal.

3. The method of claim 1, wherein the scalar data includes a slant range, radial velocity, and radial acceleration.

4. The method of claim 1, wherein the slant range is a magnitude of a receive antenna position vector minus an emitter position antenna vector.

5. The method of claim 1, wherein the radial velocity is a scalar summation of emitter and receiver opening rates.

6. The method of claim 1, wherein the radial acceleration is a derivative of the radial velocity.

7. The method of claim 3, wherein converting comprises:
performing integration of the radial acceleration to obtain a radial velocity at the second sample rate.

8. The method of claim 1, wherein determining the Doppler frequency comprises calculating the Doppler frequency based on the radial velocity and emitter carrier frequency.

9. The method of claim 1, further comprising:
determining an analog baseband frequency based on the Doppler phase and the emitter carrier frequency;
translating the analog baseband frequency into a signal having frequency, phase and pulse time arrival characteristics replicating the Doppler effect for the emitters and receivers.

10. A method, comprising:
determining with a computer slant range, radial velocity and radial acceleration for respective ones of a plurality of emitter and receiver pairs at a first sample rate;
interpolating with a computer the slant range, radial velocity and radial acceleration to produce a radial velocity and a second sample rate higher than the first sample rate;
computing with a computer a Doppler frequency based on the second radial velocity and an emitter carrier wavelength;
computing with a computer a differential phase at a third sample rate higher than the second sample rate; and applying the differential phase to the carrier signal to produce an output signal;
simulating the emitters based on the output signal.

11. A computer readable medium storing computer readable program code for causing a computer perform the steps of:
receiving state vector data regarding emitter receiver pairs sampled at a first rate;
transforming the state vector data to scalar data for each of the plurality of emitter-receiver pairs;
converting the scalar data to a slant range and a radial velocity for the emitter-receiver pair at a second sample rate higher than the first sample rate;
determining a Doppler frequency for each pair based on a carrier wavelength at the second sample rate;
determining a Doppler phase based on the Doppler frequency as a differential phase at a third sample rate that is higher than the second sample rate;
storing the Doppler frequency in a computer readable medium; and
multiplying the stored Doppler frequency based on the third sample rate.

12. A method, run on a processor, comprising:
receiving state vector data regarding emitter receiver pairs sampled at a first rate;
transforming the state vector data to scalar data for each of the plurality of emitter-receiver converting the scalar data to a slant range and a radial velocity for the emitter-receiver pair at a second sample rate higher than the first sample rate;
determining a Doppler frequency for each pair based on a carrier wavelength at the second sample rate;
determining a Doppler phase based on the Doppler frequency as a differential phase at a third sample rate that is higher than the second sample rate;
determining an analog based and frequency based on the Doppler phase and the emitter carrier frequency; and
translating the analog based and frequency into a signal having frequency, phase and pulse time arrival characteristics replicating the Doppler effect for the emitters and receivers.

13. The method of claim 12, further comprising adding an incremental Doppler phase to a carrier signal.

14. The method of claim 12, wherein the scalar data includes a slant range, radial velocity, and radial acceleration.

15. The method of claim 12, wherein the slant range is a magnitude of a receive antenna position vector minus an emitter position antenna vector.

16. The method of claim 12, wherein the radial velocity is a scalar summation of emitter and receiver opening rates.

17. The method of claim 12, wherein the radial acceleration is a derivative of the radial velocity.

18. The method of claim 15, wherein converting comprises:
performing integration of the radial acceleration to obtain a radial velocity at the second sample rate.

19. The method of claim 12, wherein determining the Doppler frequency comprises calculating the Doppler frequency based on the radial velocity and emitter carrier frequency.

* * * * *